UNITED STATES PATENT OFFICE.

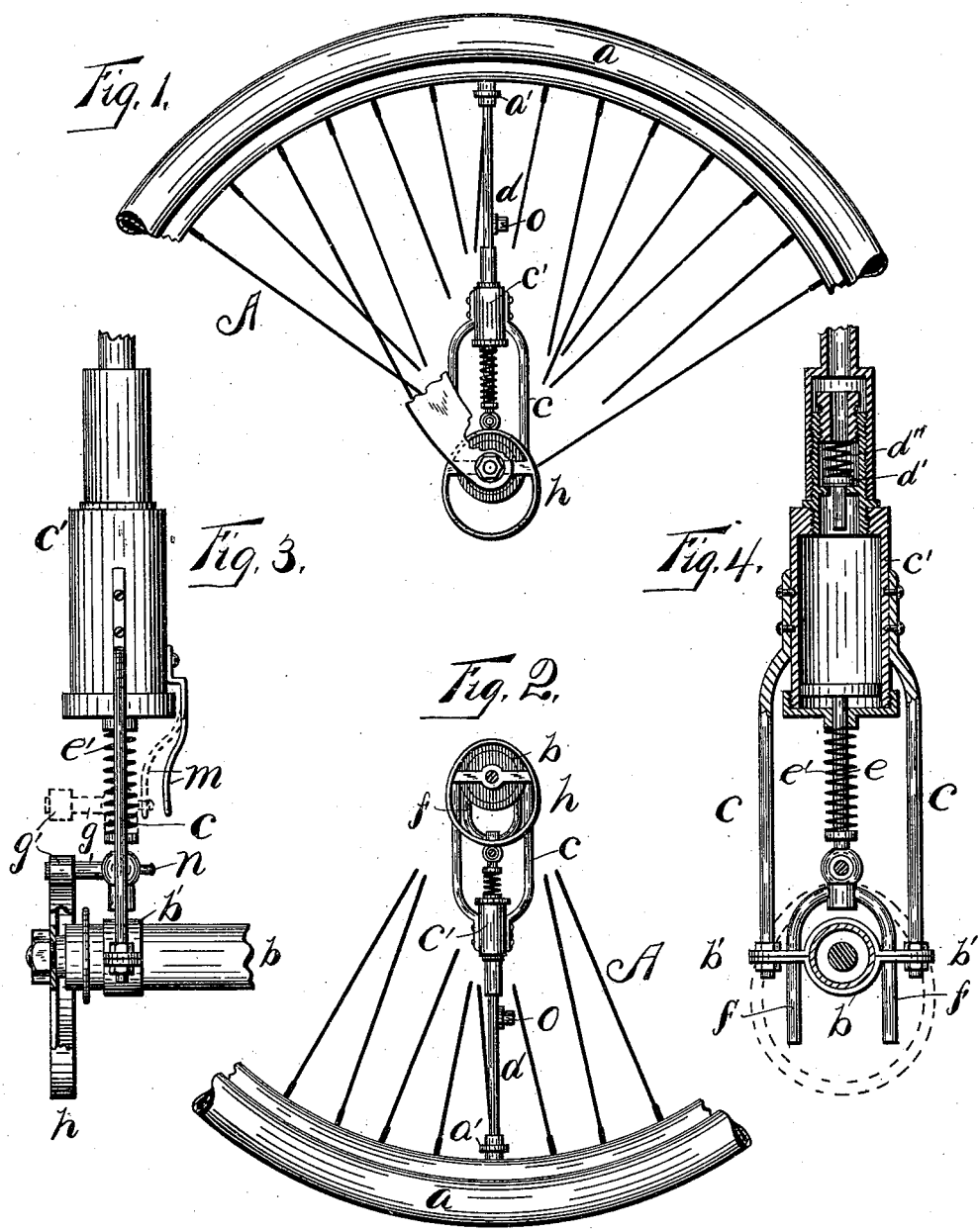

ALBERT L. CRANDALL, OF OAK'S CORNERS, NEW YORK.

BICYCLE-PUMP.

SPECIFICATION forming part of Letters Patent No. 652,997, dated July 3, 1900.

Application filed November 27, 1899. Serial No. 738,298. (No model.)

*To all whom it may concern:*

Be it known that I, ALBERT L. CRANDALL, of Oak's Corners, in the county of Ontario, in the State of New York, have invented new and useful Improvements in Bicycle-Pumps, of which the following, taken in connection with the accompanying drawings, is a full, clear, and exact description.

This invention relates to improvements in wheels which are provided with pneumatic tires, having more particular reference to the pump by which it is inflated.

My object is to provide a wheel of the above description with a permanent pump secured thereto and so arranged that it will operate to inflate the tire while in motion, and thereby obviate the necessity of the tedious process of inflating the tire by the hand, and also enables me to keep the pump in constant operation where the tire has been slightly punctured; and to that end my invention consists in the several new and novel features of construction and operation, which are hereinafter described, and specifically set forth in the claims hereunto annexed. It is constructed as follows, reference being had to the accompanying drawings, in which—

Figure 1 is a side view of a portion of a wheel, showing my pump secured thereto and in the position which it would occupy when that part of the tire to which the pump is attached is uppermost. Fig. 2 is a similar view showing its position when the weight is upon it. Fig. 3 is an edge view of the pump, hub of the wheel, and cam which operates the pump. Fig. 4 is a vertical section through the pump, showing the parts when not in use and the cam in dotted lines.

$a$ is the pneumatic tire of an ordinary wheel A, having a nipple $a'$.

$b$ is the hub, having a collar $b'$ secured thereto, and $c$ are uprights secured to the collar and support the pump $c'$. The pump $c'$ is an ordinary pump having a tube $d$ passing into the nipple $a'$, $d'$ being a valve held normally closed by the spring $d''$.

$e$ is the piston-rod, provided with a coil-spring $e'$ for the purpose of normally returning the piston-rod to position. The piston-rod is provided also with guide-rods $f$, passing through the openings in the collar $b'$, and $g$ is an arm secured to the piston-rod and at right angles thereto and provided with a frictional wheel $g'$.

Upon the outer end of the axle is secured an eccentrically-pivoted cam $h$, the periphery of which is in alinement and adapted to engage with the wheel $g'$, so that as the wheel rotates upon the axle the wheel $g'$ will engage with the cam $h$ and impart an inward motion to the piston-rod upon the pump, and then as the wheel passes around to the opposite side the spring $e'$ will return the piston-rod to its normal position. It will thus be observed that the constant motion of the wheel revolving upon the axle will cause the pump to be continuously operated.

When I desire to throw the pump out of operation, I raise the piston-rod $e$ and allow the finger $m$ to hook over the lug $n$, so as to raise the wheel $g'$ out of engagement with the cam in its rotation.

$o$ is the safety-valve upon the tube $d$, so as to prevent the tire from being inflated to the bursting-point.

Having described my invention, what I claim, and desire to secure by Letters Patent, is—

In a wheel having a pneumatic tire, a collar secured on the hub, uprights secured to the said collar and supporting a pump, a spring-controlled piston in said pump, guide-rods projecting from the piston-rod and through the collar on the hub, a lateral arm on the piston-rod, and a cam on the end of the hub bearing against said lateral arm.

In witness whereof I have hereunto set my hand this 18th day of November, 1899.

ALBERT L. CRANDALL.

Witnesses:
MILDRED M. NOTT,
HOWARD P. DENISON.